United States Patent
DeLange et al.

(10) Patent No.: US 6,581,980 B1
(45) Date of Patent: Jun. 24, 2003

(54) THREADED CONNECTION WITH HIGH COMPRESSIVE RATING

(75) Inventors: Richard W. DeLange, Houston, TX (US); Merle Edward Evans, Spring, TX (US); Darrell Scott Costa, Kingwood, TX (US); Reji Eason, Houston, TX (US)

(73) Assignee: Grant Prideco, L.P., The Woodlands, TX (US)

( * ) Notice: Subject to any disclaimer, the term of this patent is extended or adjusted under 35 U.S.C. 154(b) by 0 days.

(21) Appl. No.: 09/560,854

(22) Filed: Apr. 28, 2000

Related U.S. Application Data
(60) Provisional application No. 60/131,894, filed on Apr. 30, 1999.

(51) Int. Cl.[7] ............................. F16L 25/00; F16L 15/00
(52) U.S. Cl. ....................... 285/334; 285/333; 285/355; 285/390
(58) Field of Search .................................. 285/334, 333

(56) References Cited

U.S. PATENT DOCUMENTS

| | | | |
|---|---|---|---|
| 4,009,893 A | | 3/1977 | Schatton et al. |
| 4,085,951 A | | 4/1978 | Morris |
| 4,161,332 A | * | 7/1979 | Blose .......................... 285/334 |
| 4,192,533 A | | 3/1980 | Blose |
| 4,373,754 A | * | 2/1983 | Bollfrass et al. ............ 285/334 |
| 4,521,042 A | * | 6/1985 | Blackburn et al. .......... 285/334 |
| 4,537,428 A | | 8/1985 | Landriault |
| 4,537,429 A | * | 8/1985 | Landriault .................... 285/334 |
| 4,570,982 A | * | 2/1986 | Blose et al. ................. 285/334 |
| 4,662,659 A | * | 5/1987 | Blose et al. ................. 285/334 |
| 4,676,529 A | * | 6/1987 | McDonald .................... 285/92 |
| 4,688,832 A | | 8/1987 | Ortloff et al. |
| 4,703,954 A | | 11/1987 | Ortloff et al. |
| 4,703,959 A | | 11/1987 | Reeves et al. |
| 4,753,460 A | * | 6/1988 | Tung ............................ 285/334 |
| 4,796,928 A | * | 1/1989 | Carlin et al. ................. 285/334 |
| 4,893,844 A | | 1/1990 | Chelette et al. |
| 4,928,999 A | | 5/1990 | Landriault et al. |
| 5,154,452 A | * | 10/1992 | Johnson ....................... 285/333 |
| 5,415,442 A | * | 5/1995 | Klementich .................. 285/331 |
| 5,687,999 A | * | 11/1997 | Lancry et al. ............... 285/333 |
| 5,829,797 A | * | 11/1998 | Yamamoto et al. .......... 285/333 |

* cited by examiner

Primary Examiner—Robert J. Sandy
Assistant Examiner—Carlos Lugo
(74) Attorney, Agent, or Firm—Carlos A. Torres; Browning Bushman, P.C.

(57) ABSTRACT

The surface areas available for absorbing compressive loading of a threaded connection are increased by increasing the engaged area of a torque shoulder in the connection and by reducing the spacing between the stab flanks of the threads. The areas are increased by increasing the dimensions of the components and by decreasing the machine tolerances permitted in manufacturing the components. The gap in the connection adjacent the torque shoulder is reduced so that the contact surface area of the torque shoulder is increased while the close proximity of the surrounding cylindrical walls of the connection reduces voids that can receive plastic deformation of the torque shoulder corners. The surfaces adjacent the torque shoulder are cylindrical in shape rather than being tapered to reduce machining costs and increase the speed of manufacture of the connection. The compressive loading of the connection provides an axial seal along the bearing surface with the torque shoulder and a radial seal in the near adjacent area of the surrounding cylindrical walls. An interference seal at the end of the box face and the pin nose isolates the engaged threads from the corrosive effects of fluids on either side of the connection. The provision of cylindrical walls in the threaded area reduces side wall galling, enables easier gauging and machining, and provides an increased contact area in the cylindrical surrounding areas.

34 Claims, 3 Drawing Sheets

THREADED CONNECTION WITH HIGH COMPRESSIVE RATING

CROSS-REFERENCE TO RELATED APPLICATIONS

This application is related to, and claims the benefit of, U.S. Provisional Application Ser. No. 60/131,894 filed Apr. 30, 1999.

BACKGROUND OF THE INVENTION

1. Field of the Invention

The present invention relates to threaded connections for securing together the ends of tubular bodies. More specifically, the present invention relates to a threaded connection for connecting together tubular pipe bodies used in the construction of wells.

2. Description of the Prior Art

The pipe used in drilling and completing oil and gas wells and other wells employed in extracting minerals from the earth is typically in the form of a long string of pipe segments secured together by threaded connections provided at the end of each pipe segment. The connections serve the dual function of holding the adjoining segments together and providing a pressure seal at the connection. Stresses are encountered in the threaded connection that result from forces applied to the connection during its initial assembly into a string, forces associated with the placement of the string into the well and forces resulting from the pressure differentials acting across the engaged connection. When the stresses acting on the connection are either excessive or inadequate, the connection can fail, causing separation of the string or disrupting the pressure seal within the connection.

During the makeup and subsequent running and utilization of a typical string of casing or tubing employed in a well, the forces acting on the connection may alternate between high tension and high compression forces. Tension forces are imposed, for example, when the connection is part of a heavy string that is suspended from the well surface. Compression forces occur during the makeup of the connection and during the process of placing the connection into a well where the well bore is deviated such that the pipe string must be bent around a curve in the well bore. In the latter situation, the portion of the connection at the inside of the curve is stressed in compression relative to the portion of the connection on the outside of the curve. Concentration of excessive compressive forces within the connection can cause the connection to be permanently deformed or to fail when the compressive forces exceed design limitations of the connection.

Current drilling and completion applications require increasing compression ratings for strings being used in deeper and more deviated wells. The well string designs for these critical conditions often require the use of connections having external radial dimensions that are the same as those of the pipe or only slightly larger than the pipe body. Reducing the volume of material employed in forming the connection in an effort to reduce the pipe diameter increases the stress required to be sustained by the remaining material of the connection. In general, these reduced diameter connections have a low elastic compression rating as compared with the connections having larger outside diameters. Use of the smaller diameter connections in critical wells increases the probability that the connection will be exposed to stresses that exceed the elastic limits of the elements of the connection. Exceeding the elastic limit of the components of the connection changes the characteristics of the connection, which increases the likelihood of failure of the connection.

Conventional threaded connections fall generally into the category of interfering or non-interfering, or a combination of both. Threads that do not interfere are sometimes referred to as "free running." A connection having interference threads has dimensions such that the threads of one component interfere with the threads of the adjoining component to cause a mechanical deformation of the material of the engaged threads. Threads in a free running, non-interference-type connection may be engaged without causing any mechanical thread deformation in the made-up connection.

Some thread connections may include a combination of both interference and non-interfering, or free-running, threads. An important component of the makeup of a free running thread connection is a mechanical limit, such as a torque shoulder, that permits the connection to be tightened. In many cases, the torque shoulder also provides a sealing surface between the engaged pipe sections. Some prior art designs using free running threads provide a radial seal adjacent the torque shoulder by tapering the internal surfaces extending to the torque shoulder and forcing the tapered surfaces together during the makeup. The sealing between interference fit threads is normally obtained by mechanical engagement of the threads assisted by a void filling thread compound.

FIG. 1 illustrates a conventional prior art connection using two-step, free-running threads 11 and 12 separated by a central torque shoulder 13. The torque shoulder is formed by the engagement of circumferential shoulders in each of the members of the connection.

FIG. 2 illustrates details of the torque shoulder of the connection of FIG. 1. A typical shoulder area of a threaded connection with free-running threads has radial gaps 14 and 15 between the surfaces of the female component of the connection, or the box 16, and the male component of the connection, or the pin 17. The gaps 14 and 15 result from the large machining tolerances permitted in order to make the manufacture of the connection easier and less expensive. The presence of the gaps 14 and 15 also contributes to the ease of assembly of the connection.

The torque shoulder 13 is formed in the engaged contact area indicated at 18. The radial dimension of the contact area 18 is less than the radial dimension of the respective elements of the torque shoulder formed on the pin and box sections by an amount equal to the radial dimension of the gap 14 or 15. In some conventional connections, the area of contact represented by the bearing surface 18 may be as little as 70% of the total available surface area of the torque shoulder.

In a connection such as illustrated in FIG. 2, the compressive forces exerted against the torque shoulder during the makeup or other compressive loading of the connection can cause the areas of the torque shoulder with the smallest cross-sectional dimensions to be plastically deformed as indicated in FIG. 4. The plastic deformation is accommodated in the gaps 15 and 14 adjacent the torque shoulder 13. The deformation of the pin shoulder is indicated at 19, and the deformation of the box shoulder is indicated at 20. FIG. 4 illustrates that, under the influence of compression loading, the corners of the torque shoulder 13 will flex and distort into the open radial gaps, which permits yielding to occur at a load that is less than that theoretically sustainable by a torque shoulder having full engagement of the contacting surfaces of the torque shoulder 13. As may be appreciated, a connection such as illustrated in FIGS. 1–4 is limited in its compressive capabilities to the compressive forces that cause yielding of the weakest point of the torque shoulder that occurs at the unrestrained smallest cross-sectional area at the outside, extreme corner of the torque shoulder.

The thread design of the conventional connector illustrated in FIGS. 1–4 also plays a part in the compressive strength of the connection. As illustrated in FIG. 3, in such connections a gap 21 exists between the stab flanks of the threads 22 of the pin 17 and threads 23 of the box 16. As with the gaps formed about the torque shoulder 13, the gap 21 results from large machine tolerances that contribute to simplifying the manufacture and assembly of the connection. When the connection becomes sufficiently loaded in compression, the gap 21 is closed and the stab flank of the threads can begin to share the compressive loading exerted on the torque shoulder. However, the degree of applied compressive force necessary to close the gap 21 can exceed that required to produce the deformation of the torque shoulder indicated in FIG. 4. The net result is that the compressive loading rating for the connection illustrated in FIGS. 1–4 is limited to a value below that which would produce the yielding of the thinnest, most vulnerable portions of the torque shoulder.

SUMMARY OF THE INVENTION

The compressive load-bearing surface area in a threaded connection is increased to increase the stress compression capacity of the connection. The increased surface area is obtained by increasing thread contact areas at lower compressive loadings and by increasing the engaged area of a torque shoulder provided in the connection. The shoulder area increase is obtained by tightening the machining tolerances used in making the connection. The increased surface contact area of the torque shoulder reduces the force per unit area and limits clearance for receiving plastic deformation of the shoulder, which creates a stiffer shoulder that reduces shoulder flexing and distortion. The increase in thread dimension reduces the spacing between the stab flanks of the threads so that the gap between engaged pin and box threads closes at lower compressive loading, allowing the threads to share compressive loads with the torque shoulder before the torque shoulder is yielded.

From the foregoing, it will be appreciated that a primary object of the present invention is to increase the torque loading rating of a threaded connection employed to secure well tubulars together.

Another object of the present invention is to increase the compressive loading rating for a tubular connector without increasing the external dimensions of the connector.

An object of the present invention is to increase the contact area of a torque shoulder in an engaged threaded tubular connection to reduce the compressive loading on the torque shoulder.

Yet another object of the present invention is to provide an increased compressive load rating for a free-running thread configuration employing a torque shoulder in which the confined area about the engaged torque shoulder is limited to reinforce the torque shoulder along its area of smallest cross-sectional dimensions to prevent plastic deformation of the torque shoulder into voids adjacent the vulnerable area of the torque shoulder.

Another object of the present invention is to provide a connection having a pin and box connector member employing a torque shoulder wherein the stab flanks between the threads of the adjoined connector members are reduced to the maximum possible whereby the thread stab flanks will engage to assist in distributing compressive forces before such forces exceed the yield limitations of the torque shoulder.

The foregoing, as well as other, objects, features, and advantages of the present invention may be more readily appreciated and understood by reference to the following drawings, specification, and claims.

DESCRIPTION OF THE PREFERRED EMBODIMENTS

Figure 1:
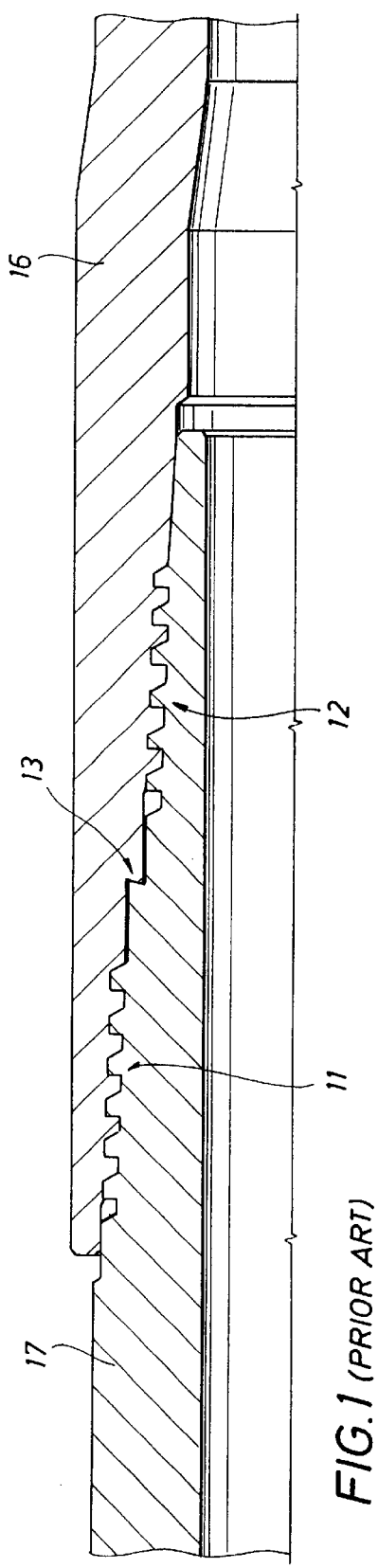
FIG. 1 is a quarter-sectional view illustrating a prior art connection.
Figure 3:
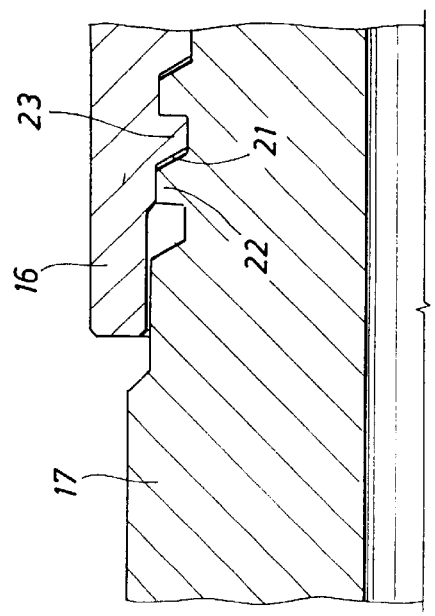
FIG. 3 is a detailed quarter-sectional view of the box end of a conventional prior art connection.
Figure 2:
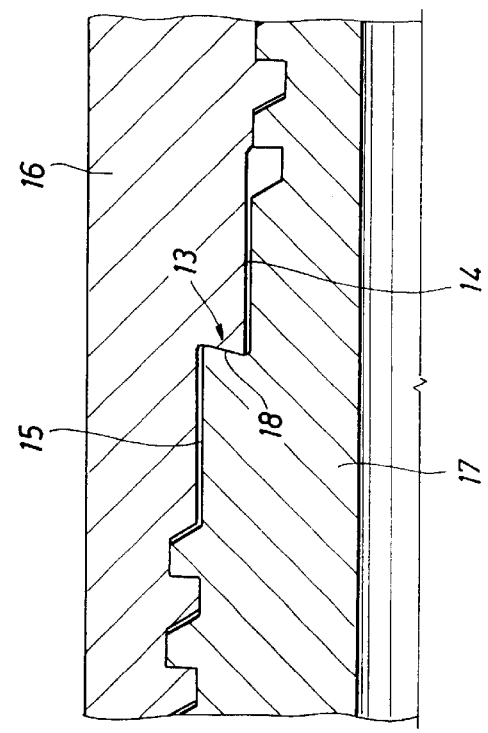
FIG. 2 is an enlarged detail of the torque shoulder area of a conventional prior art connection.
Figure 4:
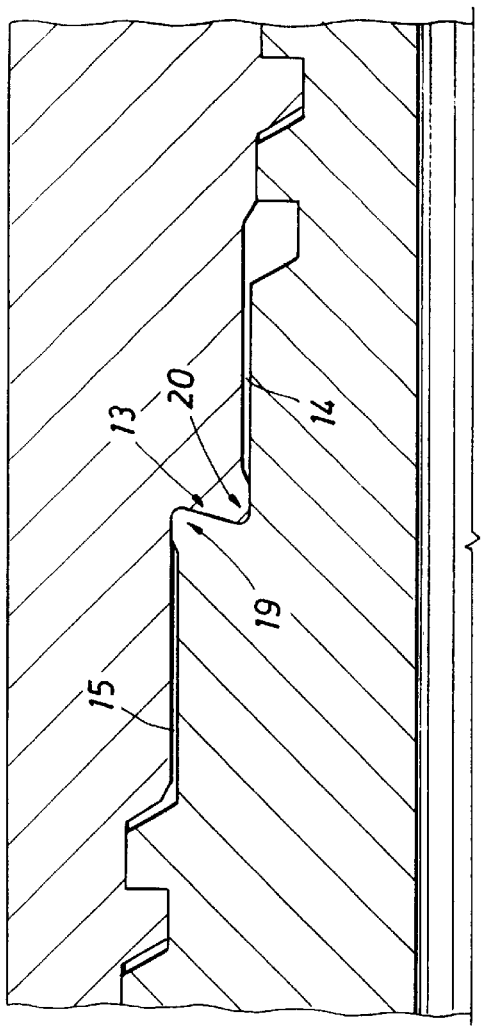
FIG. 4 is an enlarged quarter-sectional view of a conventional prior art connection illustrating deformation of the torque shoulder area of the connection under compressive loading.
Figure 5:
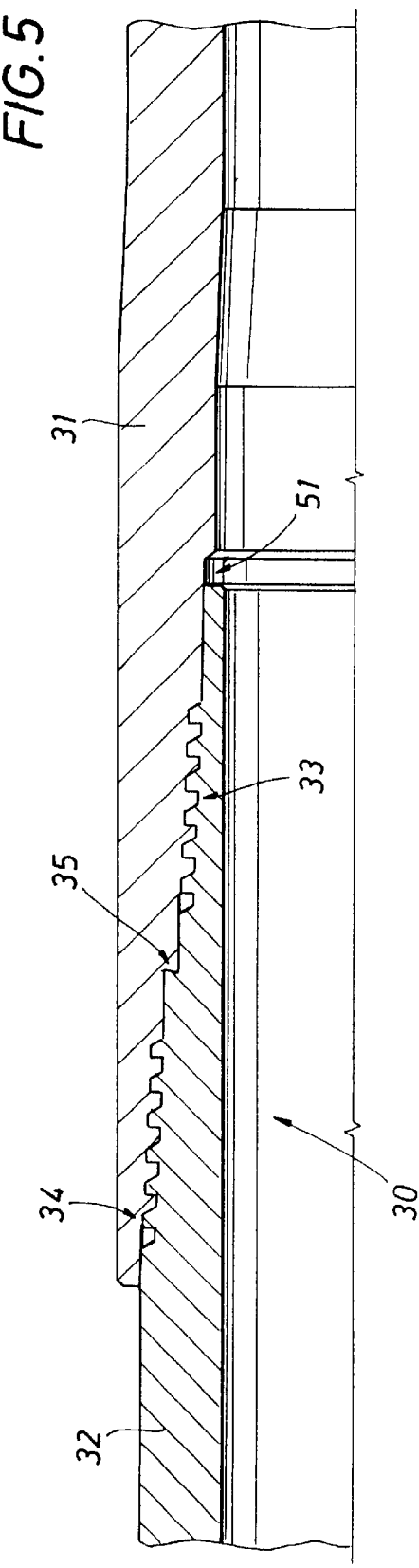
FIG. 5 is a quarter-sectional view of the connector of the present invention.

FIG. 5 illustrates a connection of the present invention indicated generally at 30. The connection 30 includes a box section 31 and a pin section 32. Two-step thread segments 33 and 34 are provided on either side of a torque shoulder indicated generally at 35. The torque shoulder 35 is a reverse angle shoulder, and the threads 33 and 34 are a hooked load flank configuration. The threads 33 and 34 depict engagement of threads formed on the external surface of the pin section 32 and the internal surface of the box section 31.

Figure 6:
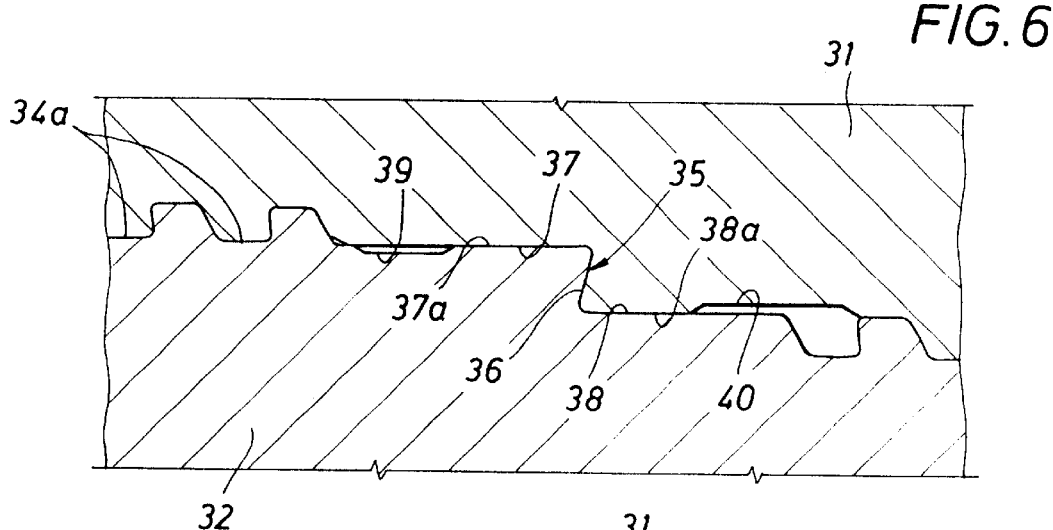
FIG. 6 is an enlarged and detailed quarter-sectional view illustrating the torque shoulder area of the present invention.
Figure 6A:
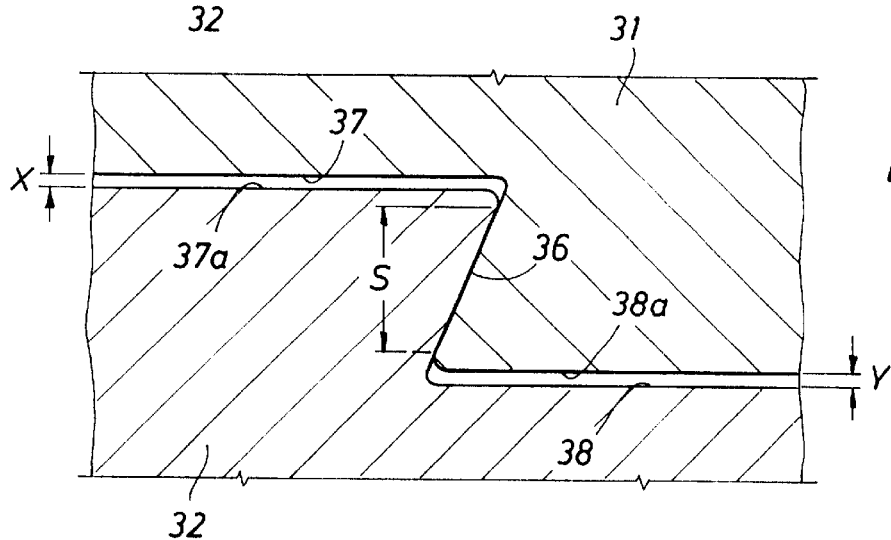
FIG. 6A is an enlarged detail view of the torque shoulder area of the connector of FIG. 6 with spacings between components being exaggerated for descriptive purposes.

Details in the torque shoulder 35 are illustrated in FIGS. 6 and 6A of the drawings. The torque shoulder 35 is illustrated with an engaged contact surface 36 that extends from a cylindrical wall 37 of the box 31 to a cylindrical wall 38 of the pin 32. A cylindrical wall 37a on the pin 32 extends under the cylindrical wall 37 on the box 31 producing a radial clearance "x" between the two cylindrical walls 37a and 37. Similarly, a cylindrical wall 38a on the box 31 extends over the cylindrical wall 38 on the pin 32 producing a radial clearance "y" between the two cylindrical walls 38a and 38. As thus described, the cylindrical surface of pin wall 38 has a larger diameter than the cylindrical surface of pin wall 37a and the cylindrical surface of box wall 37 has a larger diameter than the cylindrical surface of box wall 38a. The torque shoulder 35 is thereby formed at the ends of the cylindrical wall sections of the pin 32 and box 31. The clearances x and y between the cylindrical wall surfaces are shown grossly enlarged in FIG. 6A to assist in describing the connection characteristics in the shoulder engagement area.

The pin 32 is provided with an annular recessed area 39 that extends between the point of contact of the pin with the cylindrical surface 37 and the terminal portion of the pin threads. The recess 39 is a machining recess that facilitates the machining of the pin thread by providing a transition zone between the formation of the thread and the formation of the cylindrical surface of the pin engaging the box surface 37. A similar recess 40 formed internally of the box is provided for the same purpose with respect to the engagement of the cylindrical surface 38 with the box.

The contact surface 36 has a radial dimension S that occupies a substantially larger percentage of the area between the walls 37 and 38 than that occupied by a conventional connection, such as illustrated in FIGS. 1–4 of the prior art. The close support provided by the surrounding walls 37 and 38 eliminates voids into which the torque shoulder 36 may be received when the shoulder is plastically deformed. In a preferred case the clearances x and y, between the torque shoulder area 36 and the surrounding walls 37 and 38, respectively, are both 0.00". In accordance with the teachings of the present invention, with components machined at opposite extremes of the allowed machining tolerances, the clearance x between the walls 37 and 37a and the clearance y between the walls 38 and 38a are 0.00" or 0.004". Thus, the maximum clearance is 0.004" compared to a maximum clearance of 0.014" using standard machine tolerances.

The length of the engagement of the box 31 with the cylindrical area 37a and the engagement of the pin 32 with the cylindrical area 38a is preferably twice the height S of the torque shoulder 36; however, the engagement surface length may be as small as one-half of the height S of the torque shoulder, or less, provided it can sufficiently contain the plastic deformation of the shoulder during compressive loading.

As may be appreciated by reference to FIG. 6, the reduction in the clearance between the pin and box surfaces adjacent the torque shoulder limits the plastic deformation of the torque shoulder to provide an increased compression and bending resistance in the threaded connection. In the form of the invention illustrated in FIGS. 5–8, the normal gaps between the adjacent surfaces of the torque shoulder are closed by raising the crest of the cylindrical wall 37a of the torque shoulder beyond the plane of the thread roots 34a, which increases the compression area of the shoulder, and in turn increases the elastic load-bearing capability of the shoulder.

Conventional machining tolerances in the manufacture of the cylindrical surfaces of standard connections are +0.007–0" for the box radius. The variance is doubled for the diameter. The normal tolerance for a conventional pin is −0.007+0" on the radius. In applying these normal machine tolerances, the gap between the cylindrical walls of the pin or box and the torque shoulder wall of a conventional connection may be as large of 0.014".

In accordance with the teachings of the present invention, the tolerance permitted for the box machining is preferably ±0.002" on the radius rather than the 0.007–0" tolerance normally employed. Similarly, the tolerance on the pin is ±0.002" rather than −0.007+0", as is customarily employed. The result is that in connections having these tolerances, the torque shoulder is in close physical contact on each side with the surrounding cylindrical walls of the pin and box.

As compared with connection designs that employ tapered side walls for providing a radial seal, the connection of the present invention reduces the incidence of side galling and permits faster machining and gauging of the pin and box surfaces, which are cylindrical rather than tapered.

Figure 7:
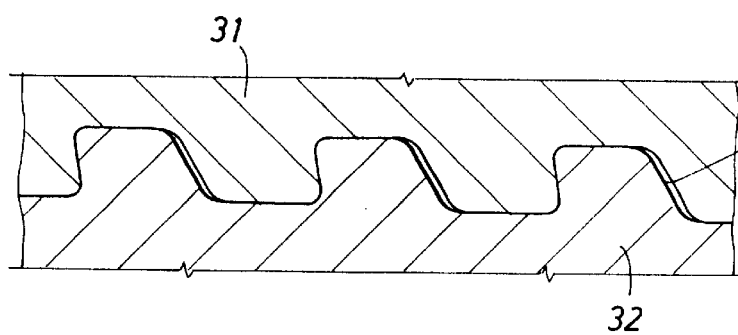
FIG. 7 is a quarter-sectional view illustrating details in the thread engagement of the connection of the present invention.

FIG. 7 illustrates details in the thread form of the connector of FIG. 5. A substantially reduced gap 45 is provided between the pin and box components of the connection. The dimensions of the gap 45 are determined by the configuration and the dimensions of the torque shoulder. In accordance with the teachings of the present invention, under compressive loading of the connection, the gap 45 is designed to close such that the stab flanks forming the gap engage at a value of compressive stress that is less than the compressive stress causing deformation of the torque shoulder. As the gap is reduced in size, machining requirements are increased and the makeup of the pin and box becomes more difficult. An objective of the present invention is therefor to reduce the gap 45 only so much as is required to distribute the compression load to the threads without yielding the torque shoulder. As the contact area of the torque shoulder is increased, the need to reduce the gap 45 is decreased. An important feature of the present invention is thus the optimization of the connection to provide the maximum torque shoulder contact area practical.

In a typical application of the connection of the present invention, the clearance between the stab flanks will preferably be 0.002–0.004 inch. The clearance or gap between stab flanks in a conventional thread design of the type illustrated in FIGS. 1–4 is 0.0200. In a connection of the present invention, the stab flank angle will preferably be 15–30° from a line perpendicular to the axis of the connection. Additionally, the load flank angle will preferably be −3° to −15° from a line perpendicular to the axis of the connection. While the thread of the present invention will preferably have radial thread interference, the thread may be free running.

The gap between stab flanks is preferably reduced by enlarging the width of the box threads. This change also increases the interference area between the engaged threads. Other methods of reducing the gap 45 may also be employed without departing from the scope of the present invention.

The torque shoulder 13 of the invention is preferably located between two tapered thread steps, as illustrated in FIG. 5; however, the thread may be straight, and the shoulder may be located elsewhere in the connection. The torque shoulder angle is preferably a reverse angle of 15° from a line perpendicular to the pipe axis; however, the angle may be as much as 5° positive and may take virtually any negative angle.

The box OD is expanded and machined, and the pin ID is swaged and bored. While the box connection is illustrated as being applied to an expanded tube, it will be appreciated that the pipe tube may also be plain or upset.

The connection of FIG. 5 has two axially spaced, tapered thread steps. The threads have a hooked load flank, with radial thread interference on the pin root/box crest. Radial thread clearance is provided on the pin crest/box root with a small clearance between stab flanks. When fully loaded in compression, the connection provides a radial metal-to-metal seal against the engaged cylindrical walls surrounding the torque shoulder.

Figure 8:
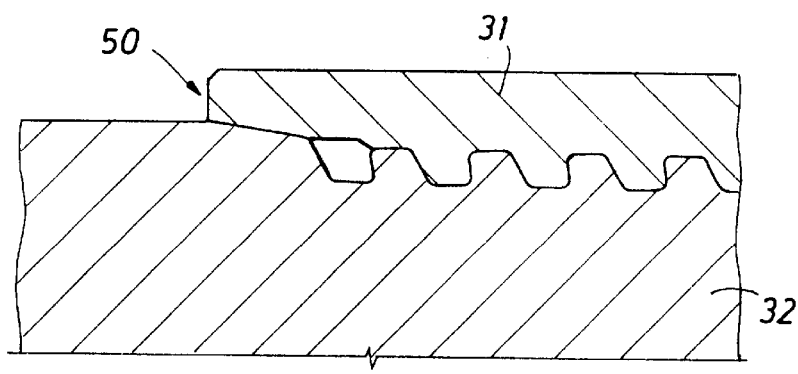
FIG. 8 is an enlarged quarter-sectional view illustrating the outside seal of the connection of the present invention.

FIG. 8 illustrates details in the outside seal of the connection of the present invention. The end of the box 31 forms an interference seal 50 with the outer surface of the pin 32. The seal 50 functions to prevent fluids in the area external to the connection from entering into the threaded area between the engaged pin and box. As best seen by reference to FIG. 5, a similar seal 51 is provided between the end of the pin 32 and the internal surface of the box 31. The seal 51 prevents fluids within the connection from entering the area between the pin and the box containing the engaged threads.

In a connection of the present invention for a 9.625-inch OD casing having a wall thickness of 0.545 inch, in 53.50 lb/ft steel, a two-step connection with a ¾-inch/ft taper on the diameter, a thread pitch of five threads per inch with a nominal height of 0.061–0.062 inch, and a lead tolerance of ±0.001 inch per step and 0.002 inch between steps, the cylindrical surfaces 37 and 38 are machined with a tolerance of ±0.002 inch. The stab flank gap in an assembled connection of 9⅝-inch casing of the present invention is 0.0035 inch, which is substantially reduced from that of the standard gap of 0.020 inch. The gap reduction is obtained by increasing the width of the box thread without changing the pin dimensions to maintain interchangeability between connections having conventional pin and box threads and the connections equipped with the thread design of the present invention.

In an analysis made comparing a standard NJO connection made by Grant Prideco, Inc. with an improved connection of the present invention, the compressive rating of a standard NJO connection for 11¾", 65#/ft, P110 pipe with a stab flank gap of 0.0190" is 13.4%, i.e., 1474 psi. The same connection made as described in the present application with a stab flank gap of 0.0035" is calculated to have a compressive rating of 40.1%, i.e. 44,110 psi.

While the invention has been described with reference to integral joint connections, it will be appreciated that the invention may be employed on coupled pipe. It will also be understood that the invention may be employed with various thread forms and connection designs without departing from the spirit or scope of the invention.

The foregoing description and examples illustrate selected embodiments of the present invention. In light thereof, variations and modifications will be suggested to one skilled in the art, all of which are in the spirit and purview of this invention.

What is claimed is:

1. A threaded connection for securing tubular bodies together comprising:
    an axially extending thread member having an external area provided with pin threads having a stab flank and a load flank;
    an axially extending box member having an internal area provided with box threads having a stab flank and a load flank, said box threads adapted to threadedly engage with said pin threads along a common axis of said pin member and said box member;
    a pin torque shoulder provided on said pin member, said pin torque shoulder formed between first and second cylindrical pin surfaces having different diameters and formed coaxially with said pin members on said external area;
    a box torque shoulder provided on said box member, said box torque shoulder formed between first and second cylindrical box surfaces having differing diameters and formed coaxially with said box member on said internal area, said box torque shoulder adapted to engage said pin torque shoulder to axially limit the threaded engagement of said pin and said box; and
    wherein the diameter of said first cylindrical box surface is selected to be larger than the diameter of said first cylindrical pin surface by an amount sufficient to confine the torque shoulders of said pin and said box to limit plastic deformation of said torque shoulders into voids between said cylindrical pin and box surfaces when said pin and box torque shoulders are plastically deformed by compression loading of said connections; and
    wherein the axial spacing between said stab flanks of said engaged pin and box threads is less than 0.0200 inches before said connection is loaded in compression; and
    wherein said stab flanks of said pin threads and said box threads are dimensioned to close and become engaged at a compression load of said connection below that causing plastic deformation of said pin or box torque shoulders whereby said compressive load is distributed over said pin and box threads and said torque shoulders for increasing the compression load rating of said connection; and
    wherein said box threads are widened axially relative to said pin threads to reduce the stab flank spacing between said engaged pin and box threads when engaged.

2. A connection as defined in claim 1 wherein the diameter of said first cylindrical box surface is less than 0.014 inches larger than the diameter of said first cylindrical pin surface.

3. A connection as defined in claim 1 wherein the diameter of said first cylindrical box surface is less than 0.008 inches larger than the diameter of said first cylindrical pin surface.

4. A connection as defined in claim 1 wherein the axial spacing between said stab flanks of said engaged pin and box threads is between 0.002 and 0.004 inches before said connection is loaded in compression.

5. A threaded connection for securing tubular bodies together comprising:
    an axially extending thread member having an external area provided with pin threads having a stab flank and a load flank;
    an axially extending box member having an internal area provided with box threads having a stab flank and a load flank, said box threads adapted to threadedly engage with said pin threads along a common axis of said pin member and said box member;
    a pin torque shoulder provided on said pin member, said pin torque shoulder formed between first and second cylindrical pin surfaces having different diameters and formed coaxially with said pin members on said external area;
    a box torque shoulder provided on said box member, said box torque shoulder formed between first and second cylindrical box surfaces having differing diameters and formed coaxially with said box member on said internal area, said box torque shoulder adapted to engage said pin torque shoulder to axially limit the threaded engagement of said pin and said box; and
    wherein the diameter of said first cylindrical box surface is selected to be larger than the diameter of said first cylindrical pin surface by an amount sufficient to confine the torque shoulders of said pin and said box to limit plastic deformation of said torque shoulders into voids between said cylindrical pin and box surfaces when said pin and box torque shoulders are plastically deformed by compression loading of said connections; and
    wherein the axial spacing between said stab flanks of said engaged pin and box threads is less than 0.0200 inches before said connection is loaded in compression; and
    wherein said pin threads and said box threads engage with radial interferences on the pin thread roots and the box thread crests.

6. A connection as defined in claim 5 wherein the crests of said pin threads do not radially interfere with the roots of said box threads.

7. A threaded connection for securing tubular bodies together comprising:
   an axially extending thread member having an external area provided with pin threads having a stab flank and a load flank;
   an axially extending box member having an internal area provided with box threads having a stab flank and a load flank, said box threads adapted to threadedly engage with said pin threads along a common axis of said pin member and said box member;
   a pin torque shoulder provided on said pin member, said pin torque shoulder formed between first and second cylindrical pin surfaces having different diameters and formed coaxially with said pin members on said external area;
   a box torque shoulder provided on said box member, said box torque shoulder formed between first and second cylindrical box surfaces having differing diameters and formed coaxially with said box member on said internal area, said box torque shoulder adapted to engage said pin torque shoulder to axially limit the threaded engagement of said pin and said box; and
   wherein the diameter of said first cylindrical box surface is selected to be larger than the diameter of said first cylindrical pin surface by an amount sufficient to confine the torque shoulders of said pin and said box to limit plastic deformation of said torque shoulders into voids between said cylindrical pin and box surfaces when said pin and box torque shoulders are plastically deformed by compression loading of said connections; and
   wherein the axial spacing between said stab flanks of said engaged pin and box threads is less than 0.0200 inches before said connection is loaded in compression; and
   wherein the crests of said pin threads do not radially interfere with the roots of said box threads.

8. A connection as defined in claim 1 wherein said pin torque shoulder is interposed axially between said pin threads and said box torque shoulder is interposed axially between said box threads.

9. A connection as defined in claim 8 wherein said pin threads and said box threads comprise two tapered thread steps.

10. A connection as defined in claim 1 wherein said pin and box torque shoulders form a reverse angle surface of engagement.

11. A connection as defined in claim 10 wherein said reverse angle surface of engagement is within 15° to 30° degrees from a line perpendicular to said common axis.

12. A connection as defined in claim 1 wherein said box member is machined on a radially expanded end section of a tubular body.

13. A connection as defined in claim 12 wherein said pin member is formed on a swaged and bored internal diameter of a tubular body.

14. A connection as defined in claim 1 wherein said load flank of said pin and said box is within −3° to −15° from a line perpendicular to said common axis.

15. A connection as defined in claim 1 wherein said pin and box connections are provided at either end of a tubular body.

16. A connector as defined in claim 15 wherein said tubular body is threaded pin-by-pin and said box member is provided by the engagement of a box-by-box coupling engaged to one pin of said tubular body.

17. A connection as defined in claim 1 wherein said pin torque shoulder has a crest raised above a thread root plane of said pin thread.

18. A threaded connection for securing tubular bodies together comprising:
   an axially extending pin member having an external area provided with pin threads having a stab flank and a load flank;
   an axially extending box member having an internal area provided with box threads having a stab flank and a load flank, said box threads adapted to threadably engage with said pin threads along a common axis of said pin member and said box member;
   a pin torque shoulder provided on said pin member, said pin torque shoulder formed between first and second cylindrical pin surfaces having differing diameters and formed coaxially with said pin member on said external area;
   a box torque shoulder provided on said box member, said box torque shoulder formed between first and second cylindrical box surfaces having differing diameters and formed coaxially with said box member on said internal area, said box torque shoulder adapted to engage said pin torque shoulder to axially limit the threaded engagement of said pin and said box;
   wherein the diameter of said first cylindrical box surface is selected to be larger than the diameter of said first cylindrical pin surface by an amount sufficient to confine the torque shoulders of said pin and said box to limited plastic deformation of said torque shoulders into voids between said cylindrical pin and box surfaces when said pin and box torque shoulders are plastically deformed by compression loading of said connection; and
   wherein the axial length of said cylindrical box surface and said cylindrical pin surface is between 1.5 and 3 times the radial dimension of said pin torque shoulder.

19. A threaded connection for securing tubular bodies together comprising:
   an axially extending pin member having an external area provided with pin threads having a stab flank and a load flank;
   an axially extending box member having an internal area provided with box threads having a stab flank and a load flank, said box threads adapted to threadably engage with said pin threads along a common axis of said pin member and said box member;
   a pin torque shoulder provided on said external area of said pin member;
   a box torque shoulder provided on said internal area of said box member, said box torque shoulder adapted to engage said pin torque shoulder to axially limit the threaded engagement of said pin and said box; and
   wherein said stab flanks of said pin threads and said box threads are dimensioned to close and engage said stab flanks of said pin and said box threads at a compression load of said connection below that causing plastic deformation of said pin or box torque shoulders whereby said compressive load is distributed over said pin and box threads and said torque shoulders for increasing the compression load rating of said connection; and
   wherein said box threads are widened axially relative to said pin threads to reduce the stab flank spacing between engaged pin and box threads before said connection is loaded in compression.

20. A connection as defined in claim 19 wherein the axial spacing between said stab flanks of said engaged pin and box threads is less than 0.0200 inches before said connection is loaded in compression.

21. A connection as defined in claim 19, wherein the axial spacing between said stab flanks of said engaged pin and box threads is 0.0020–0.004 inches before said connection is loaded in compression.

22. A connection as defined in claim 19 wherein said pin and box torque shoulders are interposed axially between said pin threads and said box threads respectively.

23. A connection as defined in claim 22 wherein said pin threads and said box threads comprise two tapered thread steps.

24. A connection as defined in claim 19 wherein said pin and box torque shoulders form a reverse angle surface of engagement.

25. A connection as defined in claim 24 wherein said reverse angle surface of engagement is within 15° to 30° from a line perpendicular to said common axis.

26. A connection as defined in claim 19 wherein said box member is machined on a radially expanded end section of a tubular body.

27. A connection as defined in claim 26 wherein said pin member is formed on a swaged and bored internal diameter of a tubular body.

28. A connection as defined in claim 19 wherein said load flank of said pin and said box is within −3 degrees to −15 degrees from a line perpendicular to said common axis.

29. A connection as defined in claim 19 wherein said pin and box connections are provided at either end of a tubular body.

30. A connection as defined in claim 29 wherein said tubular body is threaded pin-by-pin and said box member is provided by the engagement of a box-by-box coupling engaged to one pin of said tubular body.

31. A threaded connection for securing tubular bodies together comprising:
    an axially extending pin member having an external area provided with pin threads having a stab flank and a load flank;
    an axially extending box member having an internal area provided with box threads having a stab flank and a load flank, said box threads adapted to threadably engage with said pin threads along a common axis of said pin member and said box member;
    a pin torque shoulder provided on said external area of said pin member;
    a box torque shoulder provided on said internal area of said box member, said box torque shoulder adapted to engage said pin torque shoulder to axially limit the threaded engagement of said pin and said box;
    wherein said stab flanks of said pin threads and said box threads are dimensioned to close and engage said stab flanks of said pin and said box threads at a compression load of said connection below that causing plastic deformation of said pin or box torque shoulders whereby said compressive load is distributed over said pin and box threads and said torque shoulders for increasing the compression load rating of said connection; and
    wherein the axial length of said cylindrical box surface and said cylindrical pin surface is between 1.5 and 3 times the radial dimension of said pin torque shoulder.

32. A threaded connection for securing tubular bodies together comprising:
    an axially extending pin member having an external area provided with pin threads having a stab flank and a load flank;
    an axially extending box member having an internal area provided with box threads having a stab flank and a load flank, said box threads adapted to threadably engage with said pin threads along a common axis of said pin member and said box member;
    a pin torque shoulder provided on said external area of said pin member;
    a box torque shoulder provided on said internal area of said box member, said box torque shoulder adapted to engage said pin torque shoulder to axially limit the threaded engagement of said pin and said box; and
    wherein said stab flanks of said pin threads and said box threads are dimensioned to close and engage said stab flanks of said pin and said box threads at a compression load of said connection below that causing plastic deformation of said pin or box torque shoulders whereby said compressive load is distributed over said pin and box threads and said torque shoulders for increasing the compression load rating of said connection; and
    wherein the crests of said pin threads do not radially interfere with the roots of said box threads.

33. A threaded connection for securing tubular bodies together comprising:
    an axially extending pin member having an external area provided with pin threads having a stab flank and a load flank;
    an axially extending box member having an internal area provided with box threads having a stab flank and a load flank, said box threads adapted to threadably engage with said pin threads along a common axis of said pin member and said box member;
    a pin torque shoulder provided on said external area of said pin member;
    a box torque shoulder provided on said internal area of said box member, said box torque shoulder adapted to engage said pin torque shoulder to axially limit the threaded engagement of said pin and said box; and
    wherein said stab flanks of said pin threads and said box threads are dimensioned to close and engage said stab flanks of said pin and said box threads at a compression load of said connection below that causing plastic deformation of said pin or box torque shoulders whereby said compressive load is distributed over said pin and box threads and said torque shoulders for increasing the compression load rating of said connection; and
    wherein said pin threads and said box threads engage with radial interferences on the pin thread roots and the box thread crests.

34. A connection as defined in claim 33 wherein the crests of said pin threads do not radially interfere with the roots of said box threads.

* * * * *